United States Patent [19]

Nebelung

[11] Patent Number: 4,612,032
[45] Date of Patent: Sep. 16, 1986

[54] GLASSWARE FORMING MACHINE WITH PARISON CATCHING DEVICE

[75] Inventor: Hermann H. Nebelung, Zurich, Switzerland

[73] Assignee: Emhart Industries, Inc., Farmington, Conn.

[21] Appl. No.: 666,691

[22] Filed: Oct. 31, 1984

[30] Foreign Application Priority Data

Nov. 16, 1983 [GB] United Kingdom ............... 8330573

[51] Int. Cl.4 .................................................. C03B 9/44
[52] U.S. Cl. ........................................ 65/165; 65/239;
65/240; 65/260
[58] Field of Search ............... 65/239, 241, 260, 165, 65/158

[56] References Cited

U.S. PATENT DOCUMENTS 1,766,979 6/1930 Canfield ............................ 65/165 X
4,349,368 9/1982 Hüllen et al. ..................... 65/158 X Primary Examiner—Arthur Kellogg
Attorney, Agent, or Firm—H. Samuel Kieser

[57] ABSTRACT

A glassware forming machine of the individual section type has a parison catching device movable between an intercepting position, in which it is in the path of a glass parison being transferred between mould arrangements of the machine and, in the event of a machine breakdown, can direct the parison to a cullet chute, and an out-of-the-way position of the device is above the intercepting position thereof and moving means for the device is arranged, in the event of a power failure, to move the device into its intercepting position.

8 Claims, 5 Drawing Figures

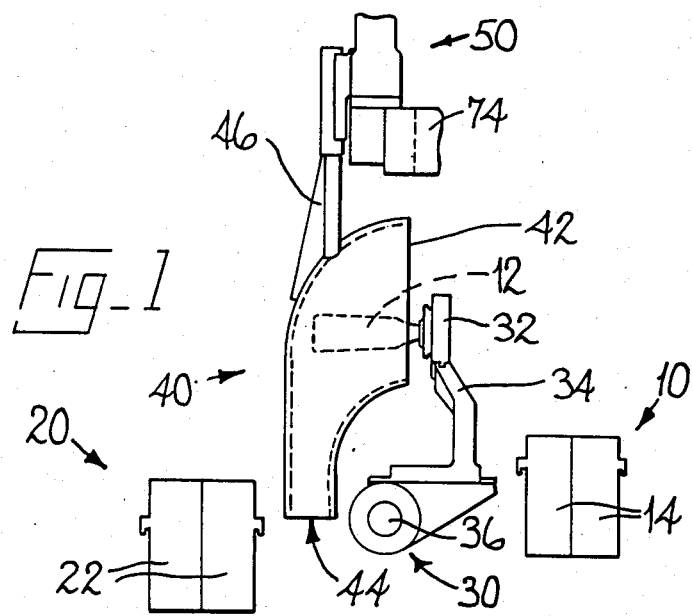
Fig_1
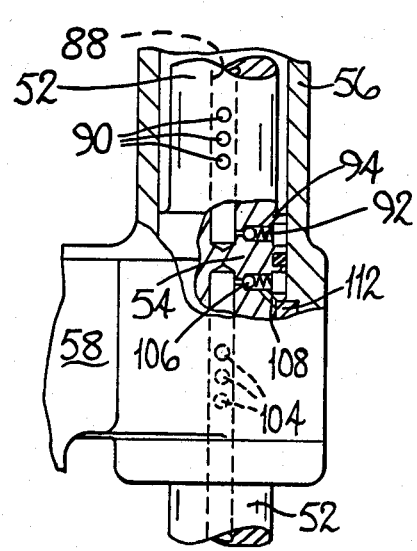
Fig_4
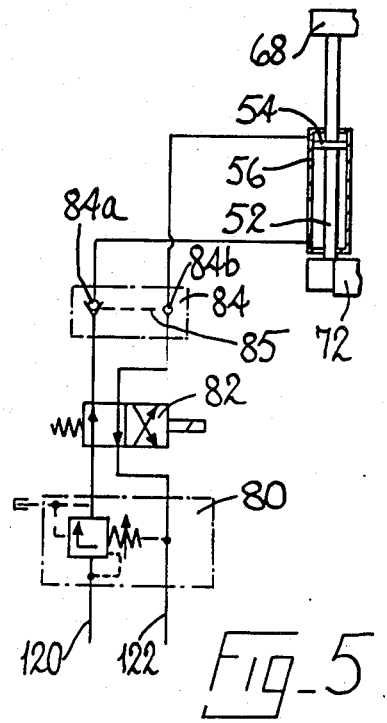
Fig_5

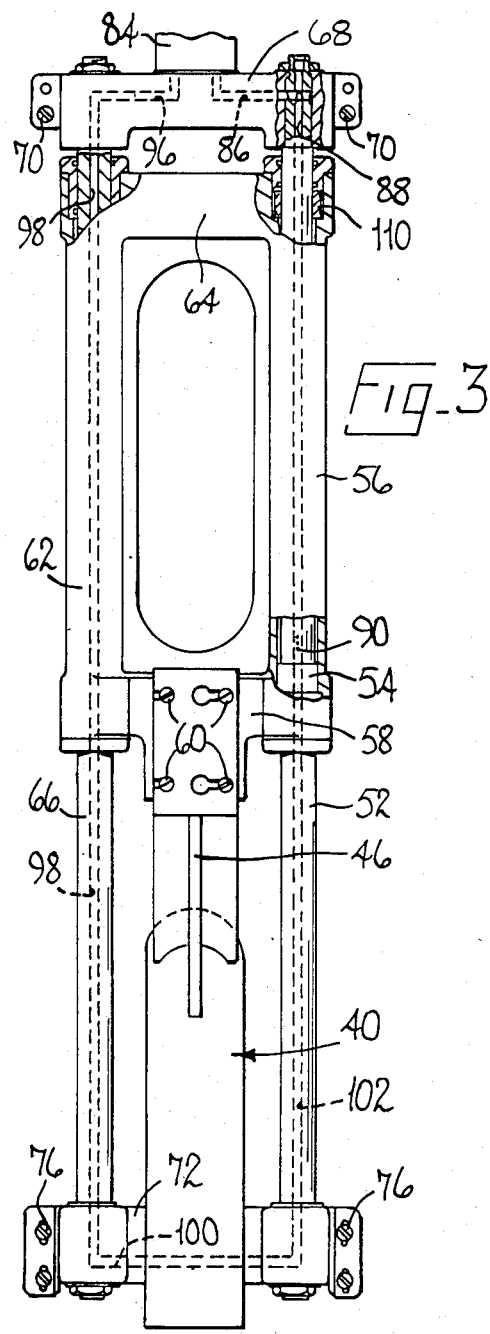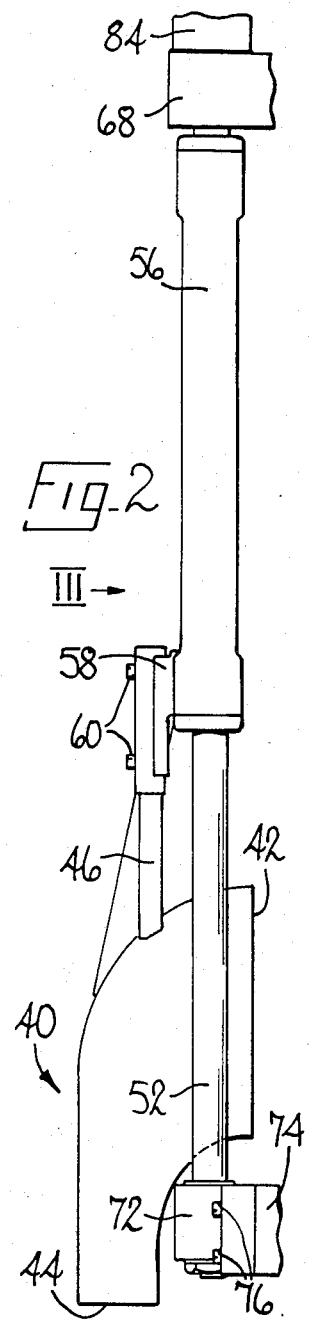

GLASSWARE FORMING MACHINE WITH PARISON CATCHING DEVICE

BACKGROUND OF THE INVENTION

This invention is concerned with a glassware forming machine with parison catching device and in particular with a glassware forming machine of the individual section type comprising a first mould arrangement by which gobs of molten glass are moulded into parisons, a second mould arrangement by which parisons moulded by the first mould arrangement are moulded into articles of glassware, transferring means operable to transfer parisons from the first mould arrangement to the second mould arrangement, the transferring means comprising a neck ring operable to grip a neck portion of a parison in the first mould arrangement and release it in the second mould arrangement, an arm on which the neck ring is mounted, and turning means operable to turn the arm about a horizontal axis to move the neck ring between the first and second mould arrangements, and a parison catching device mounted to be moved by moving means therefor between an out-of-the-way position thereof and an intercepting position thereof in the path of a parison being transferred from the first mould arrangement to the second mould arrangement by the transferring means so that, the catching device, when in its intercepting position, can receive a parison from the transferring means and guide it to a cullet chute.

A glassware forming machine of the individual section type takes an appreciable time, after the machine has been started from cold, to reach working conditions under which satisfactory glassware can be formed. In particular, it is necessary to bring the mould or moulds of a first mould arrangement by which gobs of molten glass are moulded into parisons to a required temperature, and also to bring a mould or moulds of a second mould arrangement by which parisons moulded by the first mould arrangement are moulded into articles of glassware to a different required temperature. During the period before the required temperatures are achieved, articles formed by the machine are unsatisfactory and are returned to a furnace in the form of "cullet" so that the glass therein can be reused. Clearly, similar problems arise once the machine is stopped for any reason, loss of production occurring not only while the machine is stopped but also during a subsequent period during which the required temperatures are re-established. It is necessary to stop the machine if a fault occurs anywhere therein with the result that the moulds of the first and second mould arrangements begin to cool. The use of a parison catching device has been proposed in European Patent Specification No. 40756 and alleviates the above-mentioned problem by enabling the first mould arrangement of the machine to continue to operate even when the second mould arrangement thereof is stopped because of a fault therein. In this case, the parisons produced by the first mould arrangement are intercepted by the catching device and so do not reach the second mould arrangement. Thus, the temperature of the mould or moulds of the first mould arrangement can be maintained so that the loss of production is reduced. However, in the arrangement described in European Patent Specification No. 40756, the catching device is moved along a horizontal path between an out-of-the-way position thereof and an intercepting position thereof. This arrangement has the disadvantages that space has to be provided for the out-of-the-way position of the catching device to one side of each section of the machine at a position where space is at a premium, and, furthermore, in the event of a power failure occurring, the catching device is not automatically moved into its intercepting position so that a potentially dangerous situation can occur in which parisons arrive unexpectedly at the second mould arrangement of the machine.

It is an object of the present invention to provide a glassware forming machine in which the above-mentioned disadvantages are avoided by the provision of a more compact and safe arrangement.

BRIEF SUMMARY OF THE INVENTION

The invention provides a glassware forming machine of the individual section type comprising a first mould arrangement by which gobs of molten glass are moulded into parisons, a second mould arrangement by which parisons moulded by the first mould arrangement are moulded into articles of glassware, transferring means operable to transfer parisons from the first mould arrangement to the second mould arrangement, the transferring means comprising a neck ring operable to grip a neck portion of a parison in the first mould arrangement and release it in the second mould arrangement, an arm on which the neck ring is mounted, and turning means operable to turn the arm about a horizontal axis to move the neck ring between the first and the second mould arrangements, and a parison catching device mounted to be moved by moving means therefor between an out-of-the-way position thereof and intercepting position thereof in the path of a parison being transferred from the first mould arrangement to the second mould arrangement by the transferring means so that, the catching device, when in its intercepting position, can receive a parison from the transferring means and guide it to a cullet chute, wherein the out-of-the-way position of the catching device is above the intercepting position thereof and the moving means of the catching device is so arranged that the catching device moves into the intercepting position in the event of a power failure to the moving means.

In a glassware forming machine according to the last preceding paragraph, the out-of-the-way position of the catching device is above the path of the parison in a location in which space is not at a premium and, furthermore, the arrangement fails safe.

Conveniently, the moving means of the catching device may comprise a vertically-extending rod mounted above the intercepting position of the catching device, a piston fixed to a central region of the rod, and a cylinder slidably mounted on the rod within which cylinder the piston fixed to the rod is received so that, when fluid under pressure is introduced into the cylinder, the cylinder is caused to slide along the rod, the catching device being mounted on the cylinder for movement therewith.

In order to protect the connections to the cylinder, the rod may contain passages through which fluid under pressure can enter or leave the cylinder. In order to reduce the risk of damage to the moving means, each passage may communicate with a plurality of longitudinally spaced ports which enter the cylinder radially so that, as the cylinder slides on the rod, the ports are successively closed so that the motion of the cylinder is cushioned.

In order to provide additional guidance for the motion of the catching device, the cylinder may be rigidly connected to a further cylinder which is slidable on a further vertically-extending rod to guide the catching device in its movement. In order to assist in moving the catching device, the further cylinder may contain a further piston fixed to a central region of the further rod so that, when fluid under pressure is introduced simultaneously into the cylinder and the further cylinder, the cylinders are caused to slide along the rods to move the catching device.

Conveniently, the rod and the further rod may be connected by an upper crosshead which is mounted on a transversely-extending manifold of the machine and by a lower crosshead which is mounted on a further transversely extending manifold of the machine.

BRIEF DESCRIPTION OF THE DRAWINGS

There now follows a detailed description, to be read with reference to the accompanying drawings, of a glassware forming machine which is illustrative of the invention. It is to be understood that the illustrative machine has been selected for description by way of example and not of limitation of the invention.

In the drawings:

FIG. 1 is a diagrammatic side-elevational view of the illustrative machine;

FIG. 2 is a side elevational view, on a larger scale than FIG. 1, of a catching device and moving means therefor of the illustrative machine;

FIG. 3 is a view taken in the direction of the arrow III in FIG. 2;

FIG. 4 is a detailed view of a piston of the moving means of the catching device of the illustrative machine; and FIG. 5 is a diagrammatic view of a hydraulic circuit of the moving means of the catching device of the illustrative machine.

DETAILED DESCRIPTION OF PREFERRED EMBODIMENT OF THE INVENTION

The illustrative machine shown in the drawings is a glassware forming machine of the individual section type comprising a first mould arrangement 10 by which gobs of molten glass are moulded into parisons 12. The position of the first mould arrangement 10 is indicated in FIG. 1 by the outline of two mould portions 14 in which a parison is moulded which are shown in a mould-closed position thereof. The illustrative machine also comprises a second mould arrangement 20 by which parisons 12 moulded by the first mould arrangement 10 are moulded into articles of glassware. The position of the second mould arrangement 20 is indicated in FIG. 1 by the outline of two mould portions 22 thereof which are shown in a mould-closed position thereof. The illustrative machine also comprises transferring means 30 operable to transfer parisons from the first mould arrangement 10 to the second mould arrangement 20. The transferring means 30 comprises a neck ring 32 operable to grip a neck portion of a parison 12 in the first mould arrangement 10 and release it in the second mould arrangement 20. The neck ring 32 is mounted on an arm 34 of the transfering means 30 and the transfering means also comprises turning means (not shown) operable to turn the arm 34 about a horizontal axis 36 to move the neck ring 32 between the first 10 and the second 20 mould arrangements. In the operation of the transferring means, a parison 12 is formed by the first mould arrangement 10 while the neck ring 32 is beneath the mould portions 14. The neck ring 32 grips the neck portion of the parison 12 which is formed at the bottom of the parison. The mould portions 14 are then moved into a mould-open position and the arm 34 is turned through approximately 180° about the axis 36 (anti-clockwise viewing FIG. 1) thereby delivering the parison 12 neck portion uppermost to the second mould arrangement 20. Next, the mould portions 22 are moved into a mould-closed position thereof in which they encompass the parison 12 and the neck ring 32 releases the parison. The arm 34 is now turned in the opposite direction about the axis 36 to bring the neck ring 32 back to the mould arrangement 10 to collect the next parison when it has been formed. Glassware forming machines of this type are well known and it is therefore not necessary to describe the first and second mould arrangements 10 and 20 or the transferring means 30 in further detail.

The illustrative glassware forming machine also comprises a parison catching device 40 mounted to be moved by moving means 50 therefor between an out-of-the-way position thereof (in which it is shown in FIGS. 2 and 3) and an intercepting position thereof (in which it is shown in FIG. 1) in a the path of a parison 12 being transferred from the first mould arrangement 10 to the second mould arrangement 20 by the transferring means 30. Thus, the catching device 40, when in its intercepting position, can receive a parison 12 from the transferring means 30 and guide it to a cullet chute (not shown). The catching device 40 is in the form of a tube which has a vertically extending opening 42 which faces towards the mould arrangement 10, turns through 90° downwardly while narrowing in diameter, and has a horizontally extending opening 44 at a bottom end thereof. The arrangement is such that, when the catching device 40 is in its intercepting position, the transferring means 30 stops with the arm 34 projecting approximately vertically-upwardly and with the parison projecting through the opening 42 of the catching device 40. The neckring 32 then releases the parison 12 which falls into the catching device 40 and is guided thereby to the opening 44 thereof which is aligned with the aforementioned cullet chute. In this way, the parison 12 is prevented from reaching the second mould arrangement 20 and is safely disposed of into the cullet chute.

The catching device 40 has a bracket 46 secured to an upper portion thereof by which the catching device 40 is secured to the moving means 50.

The moving means 50 is operative to move the catching device 40 between its out-of-the-way position, the movement being upwards to the out-of-the-way position and downwards to the intercepting position. The moving means 50 comprises a vertically extending rod 52 mounted above the intercepting position of the catching device 40, a piston 54 fixed to a central region of the rod 52, and a cylinder 56 slidably mounted on the rod 52 within which cylinder 56 the piston 54 is received so that, when fluid under pressure is introduced into the cylinder 56, the cylinder 56 is caused to slide along the rod 52. The cylinder 56 is integral with a crosshead 58 on which the catching device 40 is mounted by means of screws 60 which pass through holes in the bracket 46 and are received in the crosshead 58. Thus, the catching device 40 is mounted on the cylinder 56 for movement therewith.

The crosshead 58 joins a lower end portion of the cylinder 56 to the lower end portion of a further cylinder 62 and upper end portions of the cylinders 56 and 62 are connected by a further crosshead 64. Thus, the cylinder 56 is rigidly connected to the further cylinder 62. The cylinder 62 is slidable on a further vertically extending rod 66 so that the cylinder 62 and the rod 66 serve to guide the catching device 40 in its movement. The cylinder 62 does not contain a piston similar to the piston 54 but if desired a further piston can be fixed to a central region of the rod 66 within the further cylinder 62 so that, when fluid under pressure is introduced simultaneously into the cylinder 56 and the further cylinder 62, the cylinders are caused to slide along the rods 52 and 66 to move the catching device 40, thereby providing additional power for the movement of the catching device 40.

At upper ends thereof, the rods 52 and 66 are connected by an upper crosshead 68 which is mounted on a transversely-extending manifold (not shown) of the machine by means of screws 70 which pass through the crosshead 68 and enter the manifold. The rods 52 and 66 are also connected by a lower crosshead 72 which is mounted on a further transversely-extending manifold 74 of the machine (see FIG. 1) by means of screws 76 which pass through the crosshead 72 and enter the manifold 74. The crosshead 72 is generally c-shaped in plan view so that it allows clearance for the catching device 40 to move past the crosshead 72.

The moving means 50 also comprises a hydraulic circuit shown in FIG. 5 which operates to supply hydraulic fluid under pressure to the cylinder 56 either above or below the piston 54. The hydraulic circuit comprises a pressure regulator 80, a spring return solenoid valve 82, and a non-return valve 84. These valves are mounted on top of the crosshead 68 (a portion of the non-return valve 84 being visible in FIG. 3). The circuit is operable to supply fluid under pressure to the cylinder 56 above the piston 54 by supplying the fluid to a passage 86 formed within the crosshead 68. The passage 86 is connected to a vertically extending passage 88 formed within the rod 52. The passage 88 communicates with radial passages 90 which are spaced longitudinally of the rod 52 and which enter the cylinder 56 above the piston 54 (see FIG. 4), i.e. the passages 90 communicate with the annular space formed within the piston 56 around the rod 52. The passage 88 also communicates via a non-return valve 92 with a passage 94 which enters the cylinder 56 from within the piston 54. The arrangement is such that, when hydraulic fluid under pressure is introduced into the passage 86, the fluid flows along the passage 88 and into the cylinder 56 through the passage 94 and the passages 90. This causes the cylinder 56 to slide upwardly on the rod 52 and the catching device 40 to be moved into its out-of-the-way position.

Alternatively, the hydraulic circuit can supply fluid under pressure to a passage 96 formed within the crosshead 68 which communicates with a vertically extending passage 98 formed within the rod 66. The passage 98 extends throughout the length of the rod 66 between the crossheads 68 and 72 and communicates with a passage 100 formed within the crosshead 72 which communicates with a passage 102 which extends upwardly in the rod 52. The passage 102 communicates with three passages 104, similar to the passages 90, which enter the cylinder 56 beneath the piston 54 and, via a non-return valve 106, with a passage 108 which enters the cylinder 56 from within the piston 54. Thus, when hydraulic fluid under pressure is introduced into the passage 96 it flows through the passages 98, 100 and 102 to the passages 104 and 108 so that it can enter the cylinder 56 and cause it to move downwardly on the rod 52 moving the catching device 40 into its intercepting position. When hydraulic fluid under pressure is supplied to the passage 96, the passage 86 is connected to a tank so that the fluid contained in the cylinder 56 above the piston 54 can escape through the passages 90. As the catching device 40 approaches its intercepting position, a sealing ring 110 mounted on the crosshead 64 and extending around the rod 52 successively covers the passages 90 thereby throttling the exhaust from the cylinder 56 and cushioning the motion of the catching device 40. A similar sealing ring 112 is mounted in the crosshead 58 around the rod 52 to cushion the motion in the opposite direction by successively closing the passages 104.

As mentioned above, the hydraulic circuit comprises a pressure regulating valve 80. This valve 80 has a port connected to a pump line 120 and a port connected to a tank line 122. When the solenoid valve 82 is not energised (as shown in FIG. 5) the spring thereof urges it into a position in which the pump line 120 is connected, via a non-return valve 84a of the valve 84 which is opened by pressure from the pump, to the passage 96 so that hydraulic fluid is supplied to the cylinder 56 beneath the piston 54 and the catching device 40 is moved into its intercepting position. Meanwhile the valve 82 connects the passage 86 to the tank line 122 so that the cylinder 56 above the piston 54 is exhausted, via a valve 84b of the valve 84 which includes a line 85 which when pressurised holds the valve 84a open by means of an internal cylinder (not shown) of the valve 84. This arrangement ensures that if there is a faulure in the electrical supply to the solenoid of the valve 82 the catching 40 is automatically moved into its intercepting position. Energisation of the solenoid of the valve 82 causes it to switch to a position (not shown) in which the passage 86 is supplied with hydraulic fluid under pressure by being connected to the pump line 120 and the passage 96 is connected to the tank line 122 so that the catching device 40 is moved into its out-of-the-way position. The exhaust from the bottom of the cylinder 56 is through the valve 84a which is held open by pressurisation of the line 85.

I claim:

1. A glassware forming machine of the individual section type comprising a first mould arrangement by which gobs of molten glass are moulded into parisons, a second mould arrangement by which parisons moulded by the first mould arrangement are moulded into articles of glassware, transferring means operable to transfer parisons from the first mould arrangement to the second mould arrangement, the transferring means comprising a neck ring operable to grip a neck portion of a parison in the first mould arrangement and release it in the second mould arrangement, an arm on which the neck ring is mounted, and turning means operable to turn the arm about a horizontal axis to move the neck ring between the first and the second mould arrangements, a parison catching device mounted on said machine, moving means for vertically moving said parison catching device between an out-of-the-way position wherein it is positioned above the path of the neck ring as the neck ring moves between the first and second mould arrangements and an intercepting position wherein it is positioned in the path of a parison being transferred from the final mould arrangement to the second mould arrangement by the transferring means so that the catching device, in its intercepting position, can receive a parison from the transferring device and guide it to a cullet chute, the out-of-the-way position being above the intercepting position.

2. A glassware forming machine according to claim 1, wherein the moving means of the catching device comprises a vertically-extending rod mounted above the intercepting position of the catching device, a piston fixed to a central region of the rod, and a cylinder slidably mounted on the rod within which cylinder the piston fixed to the rod is received so that, when fluid under pressure is introduced into the cylinder, the cylinder is caused to slide along the rod, the catching device being mounted on the cylinder for movement therewith.

3. A glassware forming machine according to claim 2, wherein the rod contains passages through which fluid under pressure can enter or leave the cylinder.

4. A glassware forming machine according to claim 3, wherein each passage communicates with a plurality of longitudinally-spaced ports which enter the cylinder radially so that, as the cylinder slides on the rod, the ports are successively closed so that the motion of the cylinder is cushioned.

5. A glassware forming machine according to claim 2, wherein the cylinder is rigidly connected to a further cylinder which is slidable on a further vertically-extending rod to guide the catching device in its movement.

6. A glassware forming machine according to claim 5, wherein the further cylinder contains a further piston fixed to a central region of the further rod so that, when fluid under pressure is introduced simultaneously into the cylinder and the further cylinder, the cylinders are caused to slide along the rods to move the catching device.

7. A glassware forming machine according to claim 5, wherein the rod and the further rod are connected by an upper crosshead which is mounted on a transversely-extending manifold of the machine and by a lower crosshead which is mounted on a further transversely-extending manifold of the machine.

8. A glassware forming machine according to claim 1 wherein said moving means is arranged to that the catching device can move into its intercepting position in the event of a power failure to said moving means.

* * * * *